US006983144B2

(12) United States Patent

Janssen et al.

(10) Patent No.: US 6,983,144 B2

(45) Date of Patent: Jan. 3, 2006

(54) TELEPHONE BASE UNIT HAVING DYNAMICALLY CONFIGURABLE SOFTWARE

(75) Inventors: Holger Janssen, Richmond (CA); Gary Louie, Vancouver (CA); James Dury, Vancouver (CA); Sean Wong, Vancouver (CA)

(73) Assignee: VTech Telecommunications Limited, Tai Po (HK)

( * ) Notice: Subject to any disclaimer, the term of this patent is extended or adjusted under 35 U.S.C. 154(b) by 367 days.

(21) Appl. No.: 10/338,420

(22) Filed: Jan. 8, 2003

(65) Prior Publication Data

US 2004/0203738 A1 Oct. 14, 2004

(51) Int. Cl.
*H04Q 7/20* (2006.01)

(52) U.S. Cl. .............................. 455/426.1; 455/422.1; 455/552.1; 455/550.1; 455/567; 379/419; 379/440

(58) Field of Classification Search ............. 455/426.1, 455/422.1, 552.1, 550.1, 557; 379/419, 440
See application file for complete search history.

(56) References Cited

U.S. PATENT DOCUMENTS

| | | | | |
|---|---|---|---|---|
| 5,450,471 | A | 9/1995 | Hanawa et al. | |
| 5,479,479 | A * | 12/1995 | Braitberg et al. | 455/404.1 |
| 5,526,403 | A | 6/1996 | Tam | |
| 5,715,296 | A | 2/1998 | Schornack et al. | |
| 5,732,082 | A * | 3/1998 | Wartski et al. | 370/395.6 |
| 5,774,793 | A * | 6/1998 | Cooper et al. | 455/418 |
| 6,226,497 | B1 * | 5/2001 | Guntzer et al. | 455/66.1 |
| 6,317,491 | B1 * | 11/2001 | Chang et al. | 379/142.01 |
| 6,366,784 | B1 * | 4/2002 | Hsueh | 455/462 |
| 6,704,580 | B1 * | 3/2004 | Fintel | 455/550.1 |
| 6,832,107 | B2 * | 12/2004 | Mashiko | 455/573 |
| 6,836,643 | B2 * | 12/2004 | Shealtiel | 455/74.1 |
| 6,889,065 | B2 * | 5/2005 | Holmes et al. | 455/569.2 |
| 2001/0034244 | A1 * | 10/2001 | Calder et al. | 455/556 |
| 2002/0072390 | A1 * | 6/2002 | Uchiyama | 455/557 |
| 2002/0160791 | A1 * | 10/2002 | Markowitz | 455/462 |

FOREIGN PATENT DOCUMENTS

EP 0 849 965 6/1998

OTHER PUBLICATIONS

GB Search Report dated May 19, 2004.

* cited by examiner

*Primary Examiner*—Sonny Trinh
*Assistant Examiner*—Khai Nguyen
(74) *Attorney, Agent, or Firm*—Pillsbury Winthrop Shaw Pittman LLP

(57) ABSTRACT

A cordless telephone base unit having a dynamically changeable cellular telephone adapter and partially reconfigurable software is provided. The software includes a static portion containing core application software, and a dynamic portion containing reconfigurable driver software for interfacing with an external device such as a cellular telephone. The driver software can be downloaded from a removable cellular telephone adapter. The core software and the driver software each contain interface portions at fixed locations. The interface portions provide for transparent interaction between core application and driver software.

13 Claims, 7 Drawing Sheets

TELEPHONE BASE UNIT HAVING DYNAMICALLY CONFIGURABLE SOFTWARE

BACKGROUND OF THE INVENTION

1. Field of the Invention

The present invention relates in general to cordless telephony. In particular, the invention relates to a cordless telephone base unit having dynamically configurable software.

2. Background Art

Cordless telephones are increasingly becoming the centerpiece of home telephony systems. Some models, such as those based upon the DECT or WDCT standards, provide for a plurality of cordless handsets, such that multiple extensions operate in conjunction with a common base unit and can be positioned throughout a home or workplace.

Meanwhile, cellular telephone handsets have also become popular with individuals who enjoy the portability and convenience that these wireless communication devices provide. Increasingly, cellular telephone users are finding that cellular telephone handsets can provide a reliable complement to traditional wireline telephone services.

Cellular telephone handsets are increasingly used to provide a second, or even a third phone line to complement traditional wired telephone services in a residence or office. For example, when an individual wishes to place a telephone call but cannot because the conventional wired telephone line is being used by someone else engaged in a call or by a computer connected to the Internet, the individual may use a cellular telephone handset rather than wait for the wired telephone line to become available. Many families elect to provide cellular telephone handsets to their teenage children who would otherwise frequently occupy the home's wired telephone line(s) with their often ample telephone use. The use of a cellular telephone handset in such situations is a convenient solution and often one that is less expensive than installing and maintaining a second wired telephone line at the residence or office.

It has been proposed to integrate a cellular telephone with a cordless telephone system to provide even greater advantages. For example, U.S. Published Application No. 20020072390A1, assigned to Meridian Concepts, LLC, discloses a cordless telephone base unit having a separate cradle into which a cellular telephone can be placed. The cellular telephone can then be used by the cordless telephone system as a second line that is accessible from a plurality of cordless telephone handsets.

However, cellular telephones come in a wide variety of form factors, utilizing many different, sometimes proprietary, electrical interfaces. Therefore, it would be advantageous to provide a cellular telephone interface for a cordless telephone that is capable of accommodating a wide range of cellular telephone form factors and interface protocols.

Also, many individuals upgrade their cellular telephones regularly, to take advantage of continually improving technology and every-smaller cellular telephone form factors. Thus, it would be advantageous to provide a cellular telephone interface for a cordless telephone base unit that can be easily changed by a typical consumer. It would also be advantageous to maximize the ability of a cordless telephone base unit to interface with future cellular telephones having currently-unknown electrical interfaces. Another advantageous feature would be the provision of a readily-changeable cellular telephone adapter which is relatively inexpensive to produce. The present invention provides for the implementation of these and other features, as is apparent in view of the accompanying text and drawings.

SUMMARY OF THE INVENTION

In accordance with one aspect of the invention, a cordless telephone system capable of interfacing with a cellular telephone is provided. The system includes a cellular telephone adapter which can be removably engaged with a cordless telephone base unit. The adapter includes a cellular telephone interface connector which can be removably engaged with a communications port of a cellular telephone. The adapter also includes a base interface connector which is coupled with a corresponding connector in the base unit when the adapter is electrically connected to the base unit.

The removable adapter provides for a dynamically configurable physical and electrical interface between the base unit and a particular model of cellular telephone. The adapter enables the base unit to implement an electrical communications interface required by the cellular telephone by providing appropriate driver software integrated into the adapter. Specifically, the adapter includes a digital memory device. The digital memory device is connected to the base interface connector to provide read access to the base unit, whereby the base unit can download the driver software required for the cellular telephone directly from the adapter.

The downloaded driver software is stored in base unit digital memory. The base unit digital memory is divided into several regions, including core application code, core-driver interface code, driver-core interface code, and driver code. The core-driver interface code and driver-core interface code reside in predetermined locations within the base unit digital memory. A base unit microprocessor reads driver-core interface code and driver code from the adapter digital memory device and stores the code within the base unit digital memory.

The downloading of driver software from the adapter can be triggered by the detection of an adapter being connected to the base unit, and a determination that the driver software presently stored within the base unit memory, if any, does not match the software provided by the present adapter. The base unit may also be configured to verify that the driver-interface code and the driver code stored within the base unit digital memory are uncorrupted before executing the code. If the code is corrupted, the driver-core interface code and the driver code can be prevented from executing.

The dynamically configurable cordless telephone system provides for reliable communications between the base unit and the cellular telephone. The base unit core application code can initiate procedural calls to the driver code by accessing the core-driver interface code. The core-driver interface code in turn calls the driver-core interface code, which identifies and executes the required portion of driver code. The contents and configuration of the driver code is transparent to the core application code.

Similarly, the driver code can reliably initiate procedural calls to the core application code without direct knowledge of the application code contents or configuration. Procedural calls from the driver code are directed to the driver-core interface code, which in turn references a corresponding portion of the core-driver interface code. The core-driver interface code then directs the execution of the appropriate portion of the core application code.

DETAILED DESCRIPTION OF THE DRAWINGS

Figure 1:
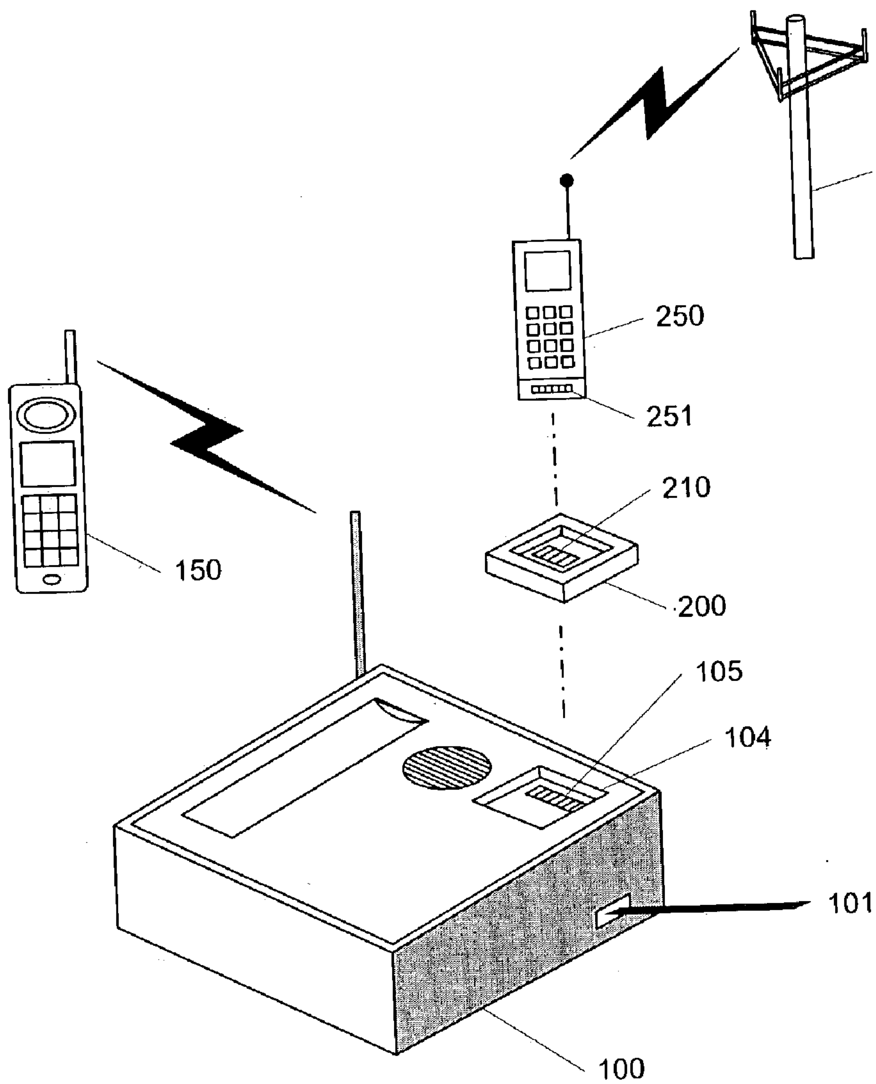
FIG. 1 is a diagram of a cordless telephone communication system according to an embodiment of the invention.

While this invention is susceptible to embodiment in many different forms, there are shown in the drawings and will be described in detail herein several specific embodiments, with the understanding that the present disclosure is to be considered as an exemplification of the principle of the invention and is not intended to limit the invention to the embodiments illustrated.

FIG. 1 illustrates a cordless telephone system according to one embodiment of the invention. Cordless telephone base unit 100 operates in conjunction with cordless telephone handset 150 to place and receive telephone calls via conventional analog telephone line 101. Base unit 100 is further provided with an interface for communications with cellular telephone 250.

The cellular telephone interface for base unit 100 includes adapter engagement region 104, which is integral to the base unit, and a removable adapter 200. Removable adapter 200 is designed to accommodate a particular model or series of cellular telephone. By providing a physically separate adapter, the cordless telephone base unit can be used with a wide variety of cellular telephones by simply replacing the adapter with one designed for use with the desired model of cellular telephone. Furthermore, the adapter includes a digital storage device storing driver software specifically configured to facilitate communications with the cellular telephone model(s) for which the adapter was designed. Thus, the adapter design provides base unit 100 with both physical and electrical compatibility with a broad array of cellular telephone designs.

Cellular telephone 250 includes interface connector 251. Interface connector 251 includes connections for powering of cellular telephone 250, connections for transfer of control data through which the operation of cellular telephone 250 can be controlled, and audio connections so that audio signals incident to cellular voice communications can be conveyed to and from cellular telephone 250.

Figure 2:
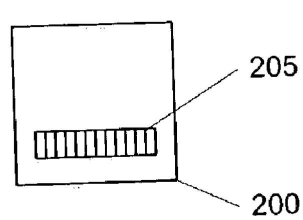
FIG. 2 is an illustration of a cellular telephone adapter.

Cellular adapter 200 provides an electrical connection with, and physical support for, cellular telephone 250. Adapter 200 includes connector 210, which can be physically and electrically engaged with cellular telephone connector 251. Thus, adapter 200 acts as a cradle for cellular telephone 250. Adapter 200 further includes connector 205 (FIG. 2) on its bottom side. Connector 205 is configured to mate with connector 105 in base unit 100, when adapter 200 is mounted within adapter engagement region 104.

Figure 3:
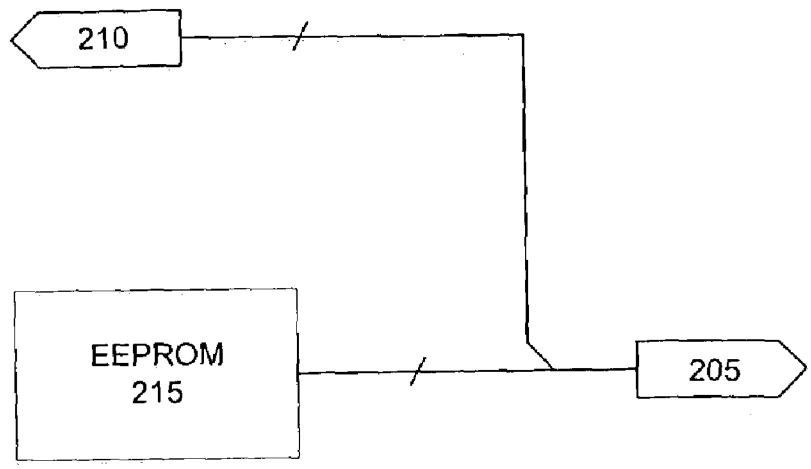
FIG. 3 is a schematic block diagram of the cellular telephone adapter.

FIG. 3 is a schematic block diagram of adapter 200. Adapter 200 provides electrical interconnection between connector 205, the physical design of which is fixed for each potential adapter design, and connector 210, which is specific to the cellular telephone with which adapter 200 is intended for use. Adapter 200 also includes Electrically Erasable Programmable Read Only Memory ("EEPROM") 215. EEPROM 215 includes a data read interface connected to various pins of connector 205.

Figure 4:
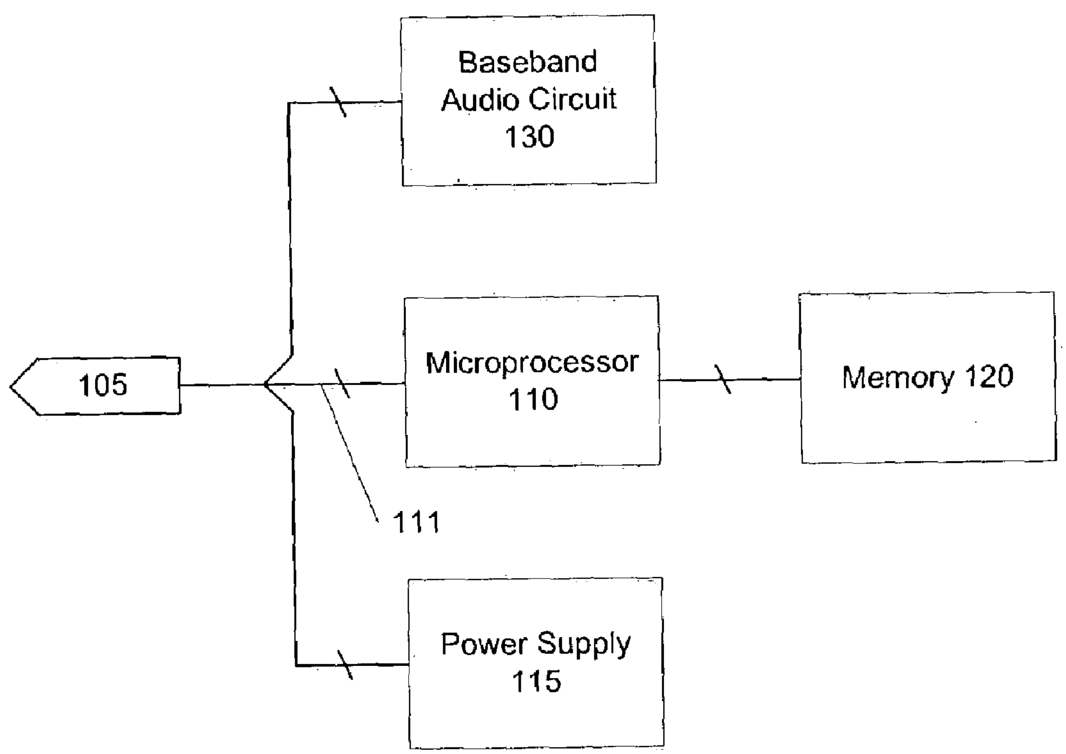
FIG. 4 is a schematic block diagram of a portion of a cordless telephone base unit.

FIG. 4 is a schematic block diagram of a portion of base unit 100. Power supply 115 provides a DC voltage to connector 105. When cellphone 250 resides within adapter 200 mounted within adapter engagement region 104, the charging current supplied by power supply 115 is conveyed to connector 105, which in turn connects to corresponding contacts of connector 205. The power is routed through adapter 200 to cellular telephone cradle connector 210. When cellphone 250 is engaged with connector 210, the charging current is in turn provided to cellphone interface connector 251, whereby a battery within cellular telephone 250, (not shown) can be recharged while the cellular telephone is cradled.

Base unit 100 further includes programmable microprocessor 110, which is also operatively coupled to connector 105. Microprocessor 110 communicates with digital memory device 120. While microprocessor 110 and digital memory 120 are illustrated as separate components, it is to be understood that in practice microprocessor 110 and memory 120 can readily be implemented within a single integrated circuit. Furthermore, microprocessor 110 can also readily be implemented as a subset of a larger integrated circuit, such as a microprocessor core within an Application Specific Integrated Circuit ("ASIC").

When adapter 200 is engaged within adapter engagement region 104, microprocessor 110 is able to communicate with and control cellular telephone 250 via control lines 111, conveyed through connectors 105, 205, 210 and 251. While conducting telephonic communications via cellular telephone 250, audio signals can be conveyed between cellular telephone 250 and base unit baseband audio circuit 130 via connectors 105, 205, 210 and 251. The particular signaling conveyed to cellular telephone 250 may vary depending upon the model of cellular telephone 250. Therefore, a flexible implementation is provided whereby the communication protocol implemented by microprocessor 110 can by dynamically reconfigured.

While it may be advantageous to provide for dynamic reconfiguration of the base unit software, it is also important that base unit 100 continue to operate reliably for its core, cordless telephone functionality. Therefore, base unit 100 implements a partial software update process each time a cellphone adapter is engaged within adapter engagement region 104, to enable implementation of the proper communication protocol for cellular telephone 250 without risking corruption of the core base unit functionality. Microprocessor 110 then uses I/O lines 111 to communicate with cellular telephone 250, using the driver software downloaded from adapter 200 to implement the communication protocol required by the electronic interface of cellular telephone 250.

Microprocessor 110 communicates with EEPROM 215 via connectors 105 and 205. Upon detecting that adapter connector 205 has been engaged with base unit connector 105, microprocessor 110 conveys signaling to EEPROM 215 to read the cellular telephone driver software code stored therein. The driver code downloaded from adapter 200 is stored within base unit memory 120. By merely storing driver software, adapter 200 can be implemented without costly hardware components that would typically be required to execute control command functionality locally on the adapter.

Figure 5:
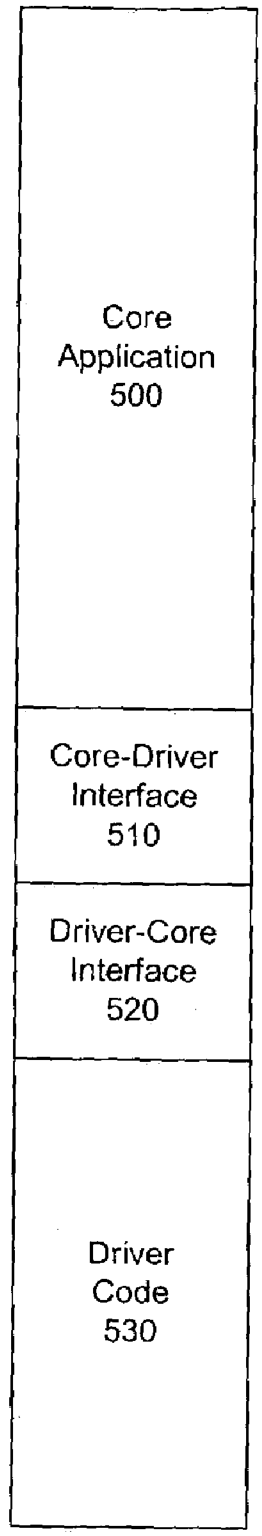
FIG. 5 is a diagram of software code memory within the base unit.

Included within memory 120 is device software code, illustrated in FIG. 5. In accordance with another aspect of the invention, the device code space is generally divided into two parts: the core section and the driver section. The core section is comprised of Core Application code 500, and Core-Driver Interface code 510. The Driver section is comprised of Driver-Core Interface code 520 and Driver Code 530.

Core Application code 500 and Core-Driver Interface code 510 are both static within the cordless telephone system. They are fixed in their content and location within memory 120. Core Application code 500 contains the software that implements the main functionality of cordless telephone base unit 100.

Core Application code 500 is preferably compatible with all versions of driver code. This is accomplished by provision of Driver-Core Interface code 520 within the dynamically configured driver software. Driver-Core Interface 520 includes a series of references to various portions of driver code 530. Each reference refers to a portion of Driver Code 530 implementing a particular type of functionality that may be desired of cellular telephone 250. The references are located at predetermined positions within memory 120 and provide points of reference for the Core Application to access software functions within the driver code without having direct knowledge of the driver code contents. The references within Driver-Core Interface 520 are called by Core-Driver Interface 510, the contents of which are directly known to Core Application 500. Interfaces 510 and 520 thereby maintain Core-Driver compatibility by allowing Driver Code 530 to change without requiring an accompanying change in the Core to Driver software references.

The driver software is dynamic, and is downloaded from adapter 200. Thus, the content of the driver software changes depending upon the particular model of cellular telephone with which adapter 200 is designed to interface. Driver-Core Interface code 520 is downloaded into predetermined locations within memory 120. Driver Code 530 is dynamic, but typically must be constrained in size to a predetermined amount of space within memory 120 that is allocated for the Driver code.

Driver Code 530 is preferably compatible with all versions of the Core software. This is accomplished by provision of Core-Driver Interface code 510 within the preconfigured core software. Core-Driver Interface 510 includes a series of references to various portions of Core Application code 500. Each reference refers to a portion of Core Application 500 implementing a particular type of functionality. The references are located at predetermined positions within memory 120 and provide points of reference for the Driver Code to access software functions within the Core Application without having direct knowledge of the Core Application itself. The references within Core-Driver Interface 510 are called by Driver-Core Interface 520, the contents of which are directly known to Driver Code 530. Interfaces 510 and 520 thereby maintain Driver-Core compatibility by allowing Driver Code 530 to be used with different versions of core application software without requiring changes in the Driver to Core software references.

Figure 6:
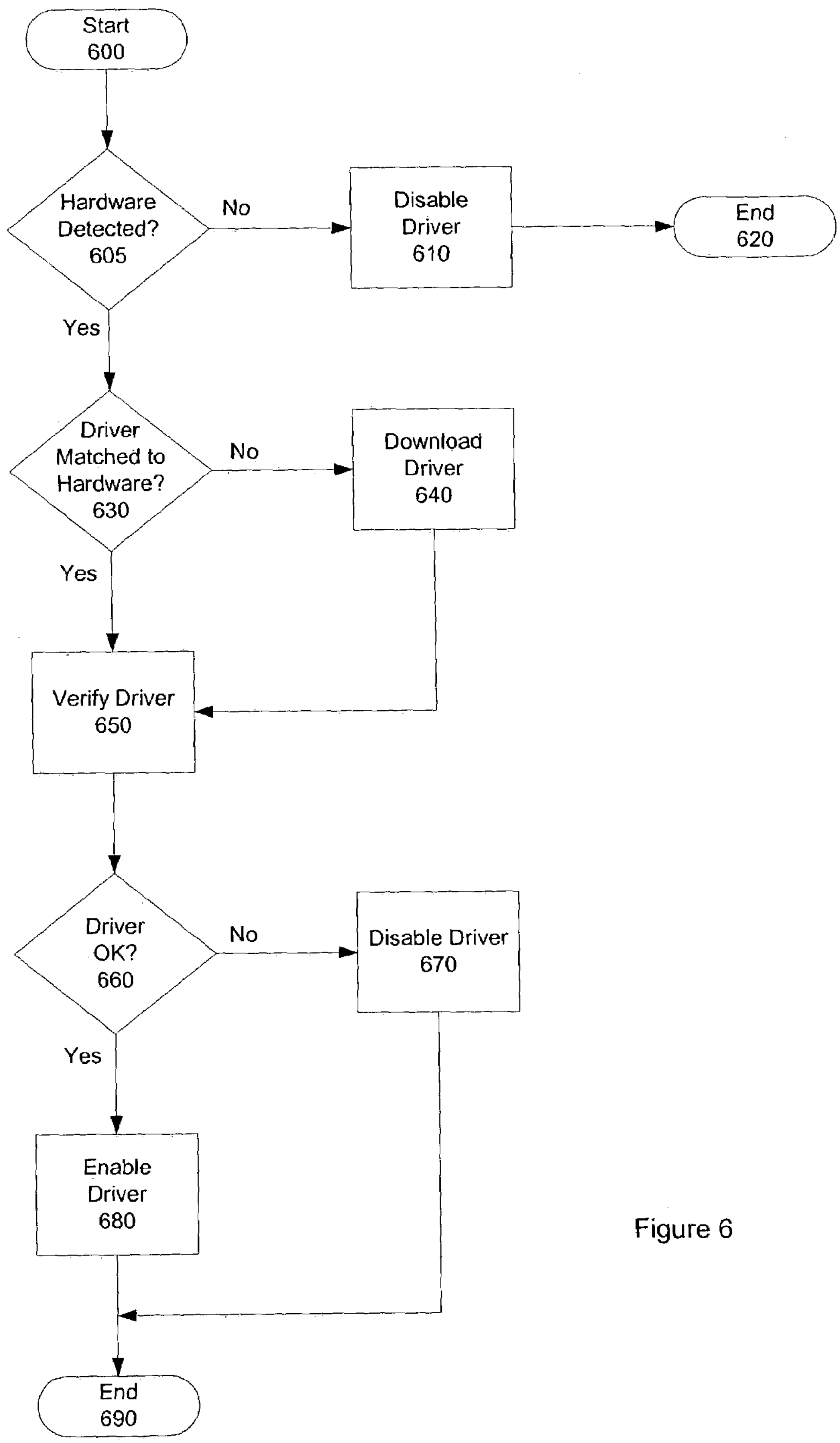
FIG. 6 is a flowchart of a base unit driver download process.

FIG. 6 is a flowchart illustrating a technique for reconfiguring the base unit software to accommodate cellular telephone 250 by downloading driver software from adapter 200. The driver download process is initiated, step 600, each time base unit 100 powers up, or when adapter 200 is newly engaged within adapter engagement region 104. In step 605, base unit 100 determines whether an adapter can be detected. This can be accomplished by microprocessor 110 polling signaling lines 111 to determine whether adapter 200 is electrically coupled to connector 105. For example, two pins of connector 205 may be directly connected, such that microprocessor 110 can detect the interconnection of the two corresponding signaling lines on connector 105 as being indicative of the presence of adapter 200.

If an adapter is not detected in step 605, then the driver software is disabled, step 610. Disabling of the driver code prevents erroneous operation of the base unit core application code. The driver download process is then terminated, step 620. However, preferably microprocessor 110 is configured to periodically poll control lines 111 during the course of its operation to determine whether a hardware adapter is subsequently engaged with the base unit. If so, the driver download process can be reinitiated.

If a hardware adapter is detected in step 605, then microprocessor 110 determines whether the driver code within memory 120, if any, is correct for the type of device for which the detected adapter is designed, step 630. This can be determined, for example, by downloading a short identification header from EEPROM 215 by microprocessor 110, and comparing the identification header to one previously stored within memory 120. If memory 120 is a static memory, then the driver code will typically be correct for the detected adapter unless a second adapter is engaged with the base unit, or no adapter has been previously engaged. If memory 120 is not a static memory, then step 630 will also typically determine that the driver code is not matched each time base unit 100 is powered up.

If the driver code within memory 120 is not matched to the hardware adapter detected, then the driver code is downloaded, step 640. Microprocessor 110 accesses EEPROM 215 via connectors 105 and 205. In so doing, it reads driver software from EEPROM 215 and stores the data within Driver-Core Interface space 520 and Driver Code space 530, of memory 120.

If the driver code within memory 120 already matches the detected hardware adapter, or if the downloading of updated driver code has been completed, then microprocessor 110 verifies the contents of the driver code that has been stored within memory 120, step 650. This can be accomplished, for example, by verifying stored checksum values or through other known error detection techniques. Verification step 650 enhances the reliability of base unit 100 by ensuring that erroneous driver software is never executed. If the contents of Driver-Core Interface 520 and Driver Code 530 are determined to be error-free in step 660, then the driver code is enabled, step 680. Otherwise, the driver code is disabled, step 670. The driver code download process is then complete, step 690. Of course, microprocessor 110 may still be programmed to periodically poll control lines 111 to ensure that adapter 200 remains engaged with base unit 100. Should adapter 200 be dislodged, the software download procedure illustrated in FIG. 6 may be repeated.

The enabling and disabling of the driver code discussed above, is implemented by a software gate provided within Core-Driver Interface 510. The software gate ensures that the Core Application code can run normally even if valid driver code is not present. When valid driver code is not present, the software gate blocks procedural calls to the Driver code, thus preventing execution of invalid code that could potentially crash the system or otherwise disrupt proper operation of the base unit.

Figure 7:
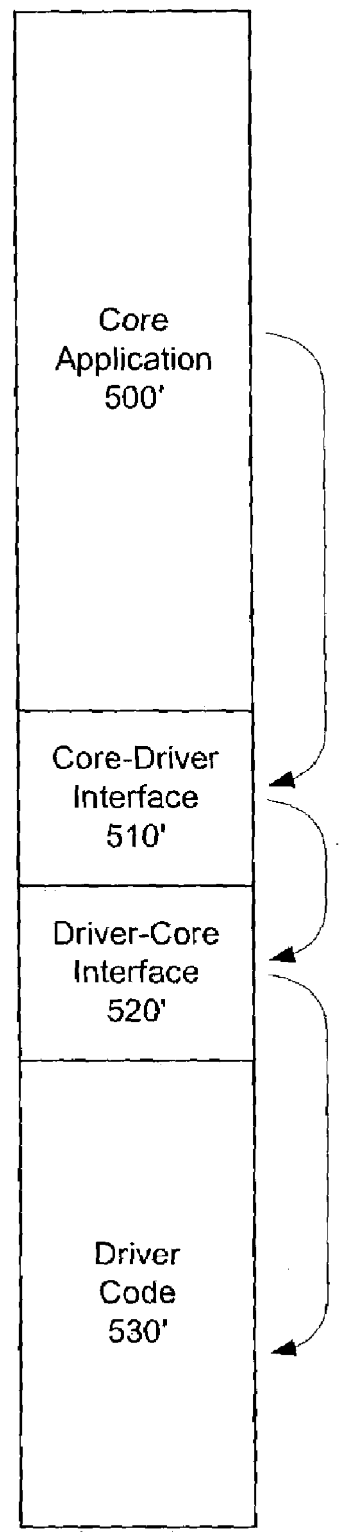
FIG. 7 is an illustration of a core to driver procedural call.
Figure 8:
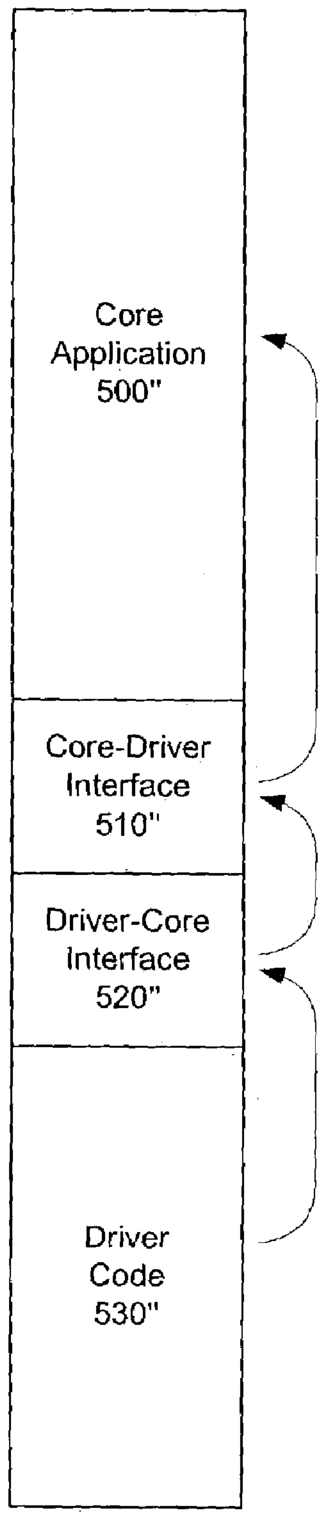
FIG. 8 is an illustration of a driver to core procedural call.
Figure 9:
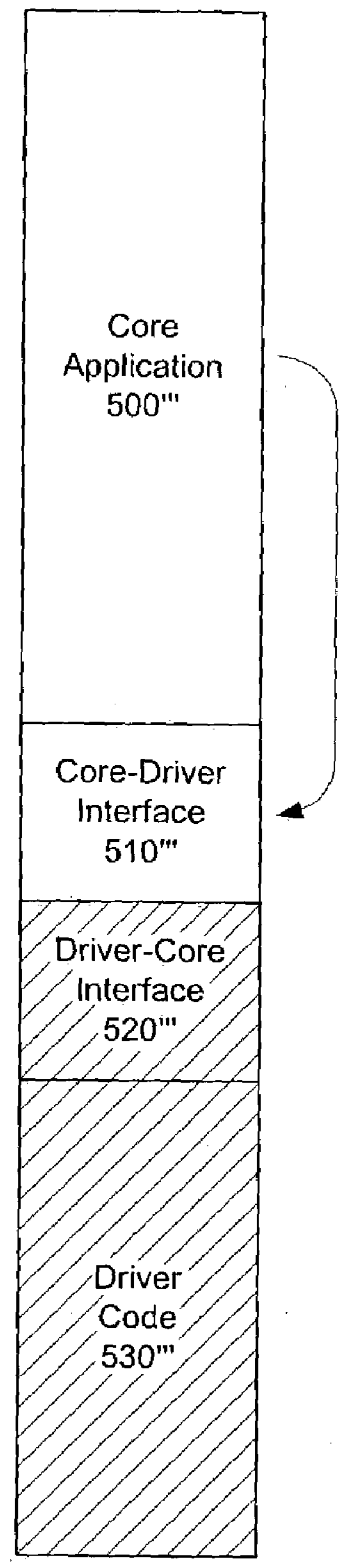
FIG. 9 is an illustration of a failed core to driver procedural call.

Example operations of the cordless telephone system are illustrated in FIGS. 7–9. FIG. 7 illustrates an example of a Core to Driver procedural call. The content and operation of the software illustrated in FIG. 7 is analogous to the software portions of FIG. 5 having the same reference numeral without the single-prime ('). To execute code within the driver software, Core Application 500' calls a function in Core-Driver Interface 510'. Core-Driver Interface 510' accesses its reference table and makes a call to Driver-Core Interface 520' corresponding to the accessed reference. Driver-Core Interface 520' then calls a portion of Driver Code 530' corresponding to the reference within Driver-Core Interface 520'. As long as Core Application 500' executes all calls to Driver Code 530' by function calls to the Core-Driver Interface and the interface-to-interface calls are predetermined, Core-Driver compatibility is maintained. Thus, the particular arrangement and implementation of Driver Code 530' is transparent to Core Application 500'.

FIG. 8 illustrates an example of a Driver to Core procedural call. The content and operation of the software illustrated in FIG. 8 is analogous to the software portions of FIG. 5 having the same reference numeral without the double-prime ("). To execute code within Core Application 500", Driver Code 530" calls a function in Driver-Core Interface 520". Driver-Core Interface 520" makes a call to Core-Driver Interface 510". Finally, Core-Driver Interface 510" calls the desired software within Application Code 500". As long as Driver Code 530" executes all Core code by function calls to Driver-Core Interface 520", and the interface-to-interface calls are predetermined, Driver-Core compatibility is maintained. The arrangement and implementation of Core Application 500" is transparent to the successful operation of Driver Code 530".

FIG. 9 illustrates an example of base unit operation when the driver code is determined to be invalid. The content and operation of the software in FIG. 9 is analogous to the software portions of FIG. 5 having the same reference numeral without the triple-prime ('"). However, Driver-Core Interface 520'" and/or Driver Code 530'" have been identified as being corrupted or otherwise invalid. Core Application 500'" calls a function in Core-Driver Interface 510'". Inasmuch as the driver software has been determined to be invalid, a software gate within Core-Driver Interface 510'" is triggered to disable access to the driver software. The call to the Driver-Core Interface is blocked, preventing execution of invalid code that might render base unit 100 inoperative or that might otherwise lead to malfunction. Because Core Application 500'" and Core-Driver Interface 510'" are fixed within memory 120 and typically not reprogrammable, the static software code that is not likely to be corrupted can be isolated from the dynamic driver code, which is prone to corruption when the code is downloaded.

The foregoing description and drawings merely explain and illustrate the invention and the invention is not limited thereto, inasmuch as those skilled in the art, having the present disclosure before them will be able to make modifications and variations therein without departing from the scope of the invention.

What is claimed is:

1. A cordless telephone system comprised of:

a cellular telephone adapter providing operative interconnection with a cellular telephone having a communications port, the adapter comprising:

a base interface connector capable of conveying a plurality of electrical signals;

a cellular telephone interface connector configured to engage with the communications port of the cellular telephone, which cellular telephone interface connector is also operatively linked with the base interface connector providing for the conveyance of electrical signals between the cellular telephone interface connector and the base interface connector;

an adapter digital memory device electrically interconnected with the base interface connector, the adapter digital memory device containing driver-core interface code and driver code;

a base unit comprised of:

an adapter interface connector configured to electrically engage with the base interface connector;

a base unit digital memory having core application code, core-driver interface code, a storage region for driver-core interface code, and a storage region for driver code, the core-driver interface code and the driver-core interface region each being located at predetermined positions within the base unit digital memory;

a microprocessor operatively connected to the adapter interface connector and the base unit digital memory, the microprocessor being configured to read the driver-core interface code from the adapter digital memory device and to store the driver-core interface code within the driver-core interface region of the base unit digital memory; the microprocessor being further configured to read the driver code from the adapter digital memory device and to store the driver code within the driver code region of the base unit digital memory.

2. The cordless telephone system of claim 1, in which the cordless telephone system is further comprised of a cordless telephone handset configured for telephonic communications with the base unit, whereby the handset is configured to initiate communications between the base unit and the cellular telephone.

3. The cordless telephone system of claim 1, in which the adapter is further configured to provide physical support for the cellular telephone when the communications port of the cellular telephone is engaged with the cellular telephone interface connector.

4. A method for updating the software of a cordless telephone base unit having digital memory, the base unit being configured for use with a cellular telephone adapter providing interconnectivity with a cellular telephone, the method comprising the steps of:

reading by the base unit of driver-core interface code and driver code stored within the cellular telephone adapter, wherein the driver-core interface code and driver code stored within the cellular telephone adapter are associated with the cellular telephone;

storing the driver-core interface code in a driver-core interface region of the base unit digital memory, the driver-core interface region being located at a first predetermined position within the memory; and storing the driver code in a driver code region of the base unit digital memory, the driver code region being located at a second position within the digital memory.

5. The method of claim 4, the method further including the preceding steps of:

detecting that the base unit is electrically connected with the device adapter;

determining that the contents of the driver code region and driver-core interface code region of the base unit digital memory do not correspond to the driver code and the driver-core interface code, respectively, stored within the cellular telephone adapter.

6. The method of claim 4, the method further including the subsequent steps of:

verifying that the driver-core interface code and the driver code stored within the base unit digital memory do not contain errors;

enabling the driver-core interface code and the driver code for execution by the base unit.

7. The method of claim 4, the method further including the subsequent steps of:

determining that the driver-core interface code or the driver code stored within the base unit digital memory contain errors;

preventing the driver-core interface code and the driver code from being executed by the base unit.

8. A method for implementing digital communications between a base unit and a cellular telephone, the method comprising the steps of:

providing core application code and core-driver interface code for execution by a microprocessor within the base unit;

providing driver-core interface code and driver code for execution by a microprocessor within the base unit;

prompting the execution of a portion of the driver code by the core application code, which step is further comprised of the substeps of:

providing procedural calls within the core application code which invoke the execution of a portion of the core-driver interface code;

making a call to the driver-core interface code by the core-driver interface code, the call invoking execution of a portion of the driver-core interface code that corresponds to the portion of the core-driver interface code from which the call is made;

calling a portion of the driver code referred to by the executed portion of the driver-core interface code;

whereby the core application code can prompt communications with the cellular telephone without directly calling the driver code.

9. The method of claim 8, in which the step of providing driver-core interface code and driver code is comprised of the substep of downloading driver-core interface code and driver code from a digital memory device provided within an adapter configured for electrical connection with the cellular telephone.

10. The method of claim 9, in which the step of providing driver-core interface code and driver code is further comprised of the subsequent substeps of:

verifying that the driver-core interface code and the driver code do not contain errors;

enabling the driver-core interface code and the driver code for execution by the base unit.

11. A method for implementing digital communications between a base unit and a cellular telephone, the method comprising the steps of:

providing core application code and core-driver interface code for execution by a microprocessor within the base unit;

providing driver-core interface code and driver code for execution by a microprocessor within the base unit;

prompting the execution of a portion of the core application code by the driver code, which step is further comprised of the substeps of:

calling a function within the driver-core interface code by the driver code;

making a call to the core-driver interface code by the driver-core interface code, the call invoking execution of a portion of the core-driver interface code that corresponds to the portion of the driver-core interface code from which the call is made;

calling a portion of the application code corresponding to the executed portion of the core-driver interface code;

whereby the driver code can prompt the execution of a portion of the application code without directly calling the application code.

12. The method of claim 11, in which the step of providing driver-core interface code and driver code is comprised of the substep of downloading driver-core interface code and driver code from a digital memory device provided within an adapter configured for electrical connection with the cellular telephone.

13. The method of claim 12, in which the step of providing driver-core interface code and driver code is further comprised of the subsequent substeps of:

verifying that the driver-core interface code and the driver code do not contain errors;

enabling the driver-core interface code and the driver code for execution by the base unit.

* * * * *